United States Patent [19]

Maher et al.

[11] Patent Number: 5,491,689

[45] Date of Patent: Feb. 13, 1996

[54] METHOD AND APPARATUS FOR AUGMENTING LISTENING CAPACITY OF A SIGNAL DESTINATION

[76] Inventors: John W. Maher, 2845 Boerderij Way, Woodstock, Ill. 60098; James H. Errico, 604 Belinder La., Schaumburg, Ill. 60173

[21] Appl. No.: 206,709

[22] Filed: Mar. 7, 1994

[51] Int. Cl.⁶ .......................... H04M 3/56; H04Q 11/04
[52] U.S. Cl. .................. 370/58.1; 370/62; 370/68.1; 370/110.1; 379/202; 455/53.1
[58] Field of Search ................................. 370/53, 54, 55, 370/56, 58.1, 58.2, 58.3, 61, 62, 66, 67, 68, 68.1, 85.1, 85.13, 94.3, 110.1, 77; 379/202, 204, 205, 207; 348/13, 14, 15, 16; 455/49.1, 53.1, 54.1, 56.1

[56] References Cited

U.S. PATENT DOCUMENTS

| | | | |
|---|---|---|---|
| 4,716,585 | 12/1987 | Tompkins et al. | 379/202 |
| 4,901,308 | 2/1990 | Deschaine | 370/62 |
| 5,070,499 | 12/1991 | Maher et al. | 370/61 |
| 5,175,727 | 12/1992 | Maher et al. | 370/62 |
| 5,204,862 | 4/1993 | Maher et al. | 370/110.1 |
| 5,229,989 | 7/1993 | Maher et al. | 370/62 |

*Primary Examiner*—Alpus Hsu

[57] ABSTRACT

Listening capacity of a signal destination is augmented through the provision of a master switching center (207) and a slave switching center (209) linked via a dedicated communication port (203). Under direction of the master switching center (207), the slave switching center (209) sums communication system data signals received from shared communication ports (201) and presents the resulting summed communication data to the dedicated communication port (203). The master switching center (207) presents the summed communication data, received via the dedicated communication port (203), to the signal destination, thus augmenting listening capacity of the signal destination.

9 Claims, 3 Drawing Sheets

METHOD AND APPARATUS FOR AUGMENTING LISTENING CAPACITY OF A SIGNAL DESTINATION

FIELD OF THE INVENTION

The present invention relates generally to communication system networks and, in particular, to a method and apparatus for augmenting listening capacity of at least one signal destination contained therein.

BACKGROUND OF THE INVENTION

Communication system networks are known to include multiple communication systems linked together through a processing multiplexer. Within each of the multiple communication systems, a signal router is used to control the flow of communication system data signals (i.e., time-division multiplexed (TDM) frames of digital audio information) between operator stations and base stations. The base stations relay the audio and control information-under the control of the signal router—to/from communication units (e.g., mobile/portable radios) within each communication system, typically via radio frequency (RF) channels. In addition to routing audio information within their respective communication systems, the signal routers support interconnection with the processing multiplexer, allowing audio information sourced by each signal router to be shared with other signal routers, and in this manner lead to the establishment of communication system networks.

Often, a signal router within a given communication system supports multiple operator stations. Furthermore, each operator station can typically monitor multiple talkgroups (i.e., a group of logically related communication units configured to transceive communications relating to the entire group). To support these requirements in a communication system network, switching centers within the processing multiplexer (each uniquely associated with one of the communication systems) sum communication system data signals associated with the relevant talkgroups. That is, simultaneously occurring data frames within the communication system data signals are added together by dedicated switching centers. The resulting summed communication system data signal is then routed to the appropriate operator station via the required signal router. For a more complete discussion of the operation of the processing multiplexer and the switching centers, reference is made to U.S. Pat. No. 5,175,727 entitled COMMUNICATION SYSTEM NETWORK INTERCONNECTING A PLURALITY OF COMMUNICATION SYSTEMS, assigned to Motorola, Inc., and incorporated herein by reference. The number of summing operations any switching center can perform within the period of a single data frame is limited by the processing capability of presently available technology.

To illustrate this limit, it is assumed that the switching centers are Ambassador boards and that the processing multiplexer is an Ambassador Electronics Bank, both manufactured by Motorola, Inc. Also assuming that the period of each data frame is 125 µs., the switching centers, as described, are currently limited to performing no more than 1746 summing operations per data frame. Thus, if a given signal router supports 30 operator stations, and each operator station monitors 50 talkgroups, then a total of 3000 summing operations (2× 30×50) need to be performed. The factor of two shown above occurs because each talkgroup requires two summing operations per data frame (in this way both parties talking can be monitored; one for the talkgroup and one for the operator station). Since 3000 summing operations per data frame cannot be supported by a single switching center, the communication system must be divided using multiple signal routers each having fewer associated operator stations. Of course, this solution is undesirable, as the additional signal routers and communication links (typically T1/E1 type phone lines required to establish connections to the processing multiplexer) required results in a system that is cost prohibitive.

Another potential solution is to upgrade the processing capability of the switching centers as more powerful processing technology—e.g., faster microprocessors—becomes available. This solution is also undesirable due to the significant costs that would occur as a result of the redesign and purchase of upgraded switching centers.

Therefore, a need exists for a method that increases the summing capability of a switching center, and thereby augments listening capacity of a signal destination having excessive summing requirements. Such a method would not require the division of existing communication systems to more evenly distribute the excessive requirements.

DESCRIPTION OF A PREFERRED EMBODIMENT

Generally, the present invention provides a method and apparatus for augmenting listening capacity of a signal destination within a communication system network. This is achieved by providing at least one dedicated communication port between a master switching center and a slave switching center. The slave switching center is used to sum communication system data signals received from shared communication ports. The resulting summed communication system data signal can then be presented to the dedicated communication port, allowing the master switching center to present the summed communication system data signal to at least one signal destination within a communication system. Such a method and apparatus allows the listening capacity of a signal destination to be increased without the use of additional equipment, and without undue reconfiguration of the communication system network.

Figure 1:
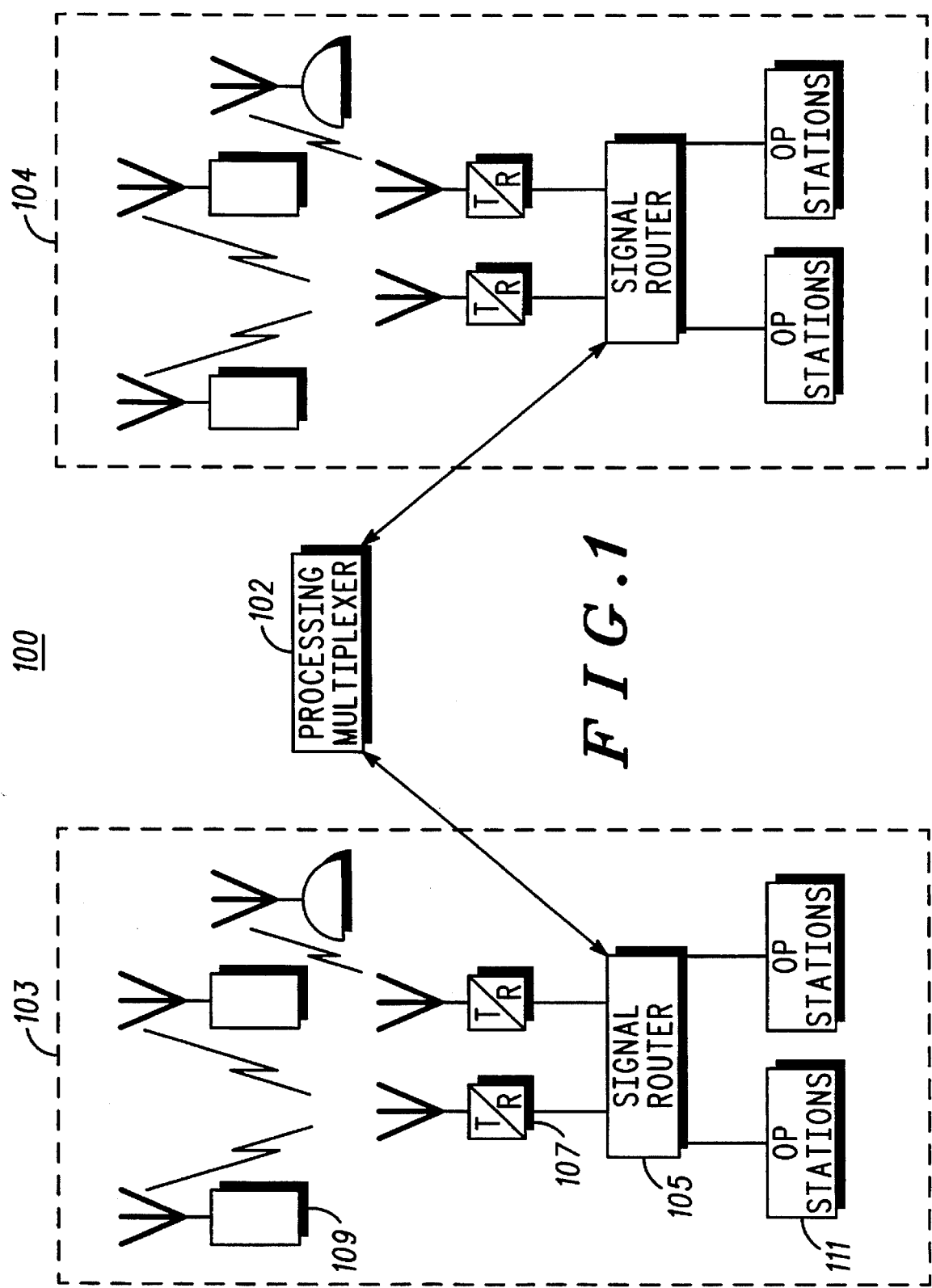
FIG. 1 illustrates a communication system network in accordance with the present invention.

The present invention can be more fully described with reference to FIGS. 1–3. FIG. 1 illustrates a communication system network (100) that includes a processing multiplexer (102) and communication systems (103, 104). Each of the communication systems (103, 104) includes a signal router (105), base stations (107), communication units (109), and operator stations (111).

Within each communication system (103, 104), communication system data signals (e.g., digital audio signals) are sourced from and destined to the various communication units (109) and operator stations (111), which may be, for example, SABER™ portable radios and CENTRACOM SERIES II™ Dispatcher Consoles, respectively, by Motorola, Inc. The base stations (107), which can be QUANTAR™ base stations by Motorola, Inc., and the signal routers (105) relay the communication system data signals between the communication units (109) and operator stations (111).

The signal router (105), which may be a so-called Central Electronics Bank (CEB) by Motorola Inc., multiplexes audio amongst the base stations (107) and operator stations (111), and routes the source and destination audio to/from the processing multiplexer (102). The processing multiplexer (102) may be a so-called Ambassador Electronics Bank (AEB) by Motorola Inc. The processing multiplexer (102) includes switching centers (not shown) that provide an interface to the communication systems (103, 104). Note that in a preferred embodiment of the present invention, the processing multiplexer (102) is capable of interfacing with up to 32 communication systems.

Processing performed in the processing multiplexer (102), via the switching centers, includes routing communication system data signals from signal sources to one or more signal destinations. Also, the processing multiplexer (102) allows summed communication system data signals from multiple signal sources to be routed to one or more signal destinations. As discussed previously, the processing capability provided by each switching center is a finite resource allocated to each communication system (103). The need for operator stations (111) to support multiple audio destinations (e.g., monitor speakers), each requiring the summing of large numbers of communication system data signals, exhausts significant portions of, and often exceeds, the total processing capabilities of the switching centers. Rather than dividing the communication systems (103, 104) and providing additional signal routers (105), the present invention utilizes the processing multiplexer (102) to avoid this undesirable design choice.

Figure 2:
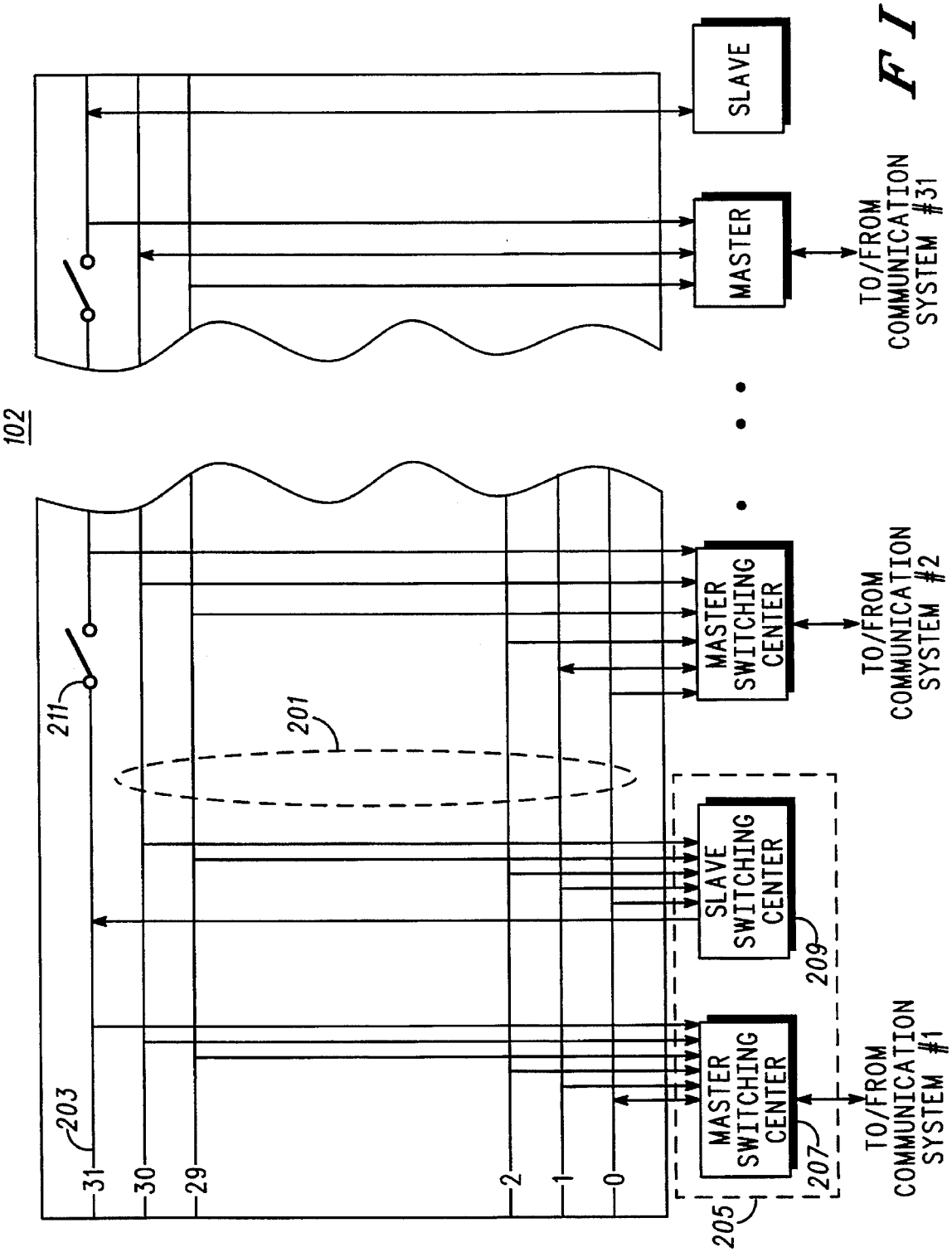
FIG. 2 illustrates a processing multiplexer in accordance with a preferred embodiment of the present invention.

FIG. 2 illustrates the processing multiplexer (102) in accordance with a preferred embodiment of the present invention. The processing multiplexer (102) includes shared communication ports (201), a dedicated communication port (203), at least one isolator switch (211), and a switching center pair (205) (only one identified). The switching center pair (205) includes a master switching center (207) and a slave switching center (209).

In a preferred embodiment shown, the master and slave switching centers (207, 209) are Ambassador boards. The switching center pair (205) is dedicated to a single communication system, shown as communication system #1, although it is noted that the switching center pair (205) might provide services to multiple communication systems. The switching center pair (205) also connects to the shared and dedicated communication ports (201, 203) in the processing multiplexer (102), as shown.

In a preferred embodiment, the shared and dedicated communication ports (201, 203) are TDM busses, as described in U.S. Pat. No. 5,175,727. Each shared communication port (201) is uniquely associated with one of the plurality of communication systems. That is, communication system data signals sourced by any given communication system are routed to a shared communication port (201) controlled by the master switching center assigned to that communication system. In this manner, a communication system can provide its associated communication system data signals to other communication systems, as well as receive the communication system data signals from other communication systems. Referring to the example shown, the master switching center (207) associated with communication system #1 can read and write communication system data signals to the shared communication port (201) identified by the number '0'; in contrast, it can only read the communication system data signals provided by the shared communication ports (201) identified by the numerals '1'–'30'. Similarly, the master switching center associated with communication system #2 can read and write the shared communication port (201) identified by the numeral '1', but can only read from the shared communication ports (201) identified by the numerals '0' and '2'–'30'.

The slave switching center (209) has read-only access to all of the shared communication ports (201) and write-only access to the dedicated communication port (203). As will be discussed in further detail hereafter, this configuration of the slave switching center (209) allows the processing capability of the master switching center (207), and hence the listening capacity of signal destinations that it serves, to be augmented. This is accomplished by designating one of the communication ports, which might otherwise be used as a shared communication port, as a dedicated communication port.

The dedicated communication port (203) may be configured through use of the isolator switches (211) to group master and slave switching centers (207, 209) into switching center pairs (205). Alternatively, some or all of the isolator switches (211) can be closed to create additional combinations of shared and dedicated communication ports (201, 203). Thus, for example, if only communication system #1 requires a dedicated communication port, the isolator switches (211) can be configured such that only one switching center pair (205) is created, allowing the remainder of the communication port to function as a shared communication port (201). In a preferred embodiment of the present invention, the dedicated communication port (201) is the $32^{nd}$ TDM bus (labeled with the numeral 31 in FIG. 2), although it is understood that any of the TDM busses could be used.

Figure 3:
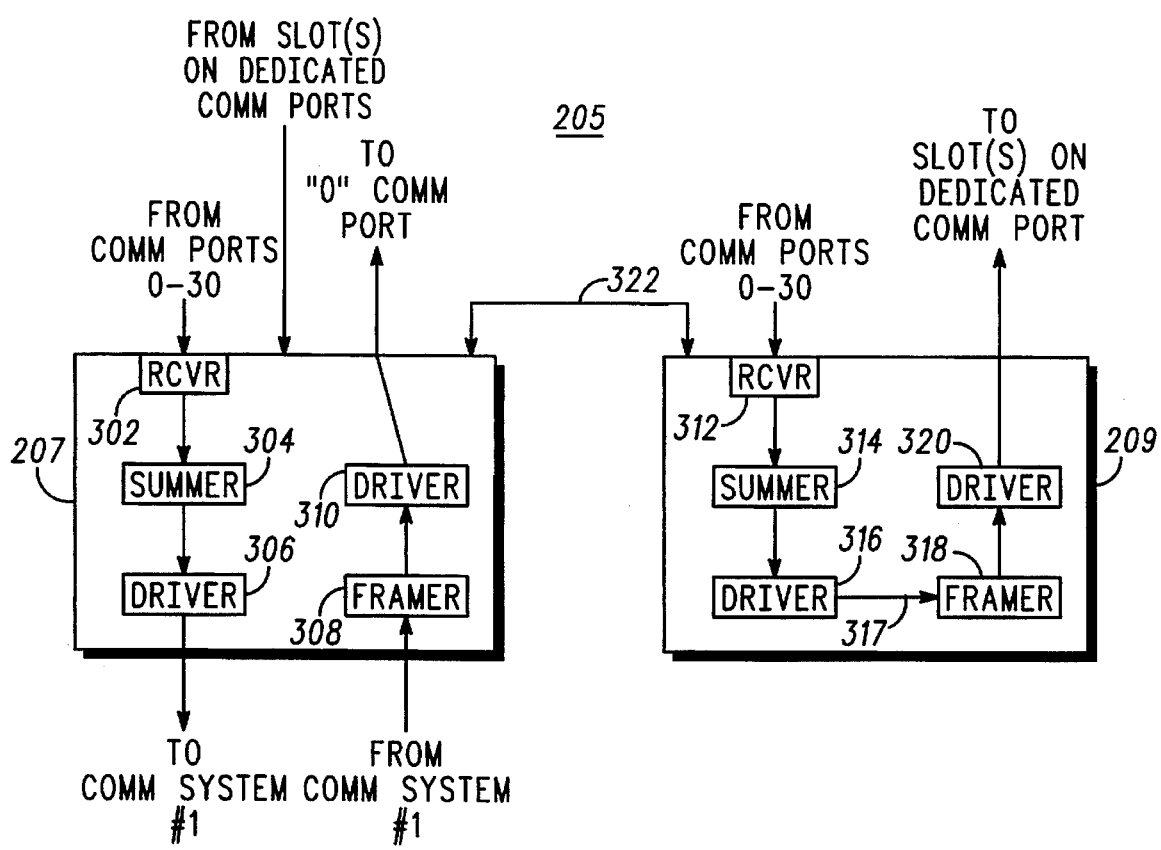
FIG. 3 illustrates a switching center pair in accordance with a preferred embodiment of the present invention.

FIG. 3 illustrates a block diagram of the switching center pair (205) in accordance with a preferred embodiment of the present invention. The master and slave switching centers (207, 209) each include receivers (302, 312), sure, hers (304, 314), drivers (306, 310, 316, 320), and framers (308, 318). Note that the master and slave switching centers (207, 209) share information via a control line (322), as later described. Also, the slave switching center (209) includes, unlike the master switching center, a loopback path (317).

The framers (308, 318) may be elastic storage buffers in memory (not shown). The receivers (302, 312) and the drivers (306, 310, 316, 320) may be trapezoidal bus transceivers and/or RS422 bus drivers. The summers (304, 314) may be field programmable gate arrays implementing audio routing and summing in hardware. Assuming that the processing multiplexer (102) is implemented using a card-cage assembly having a backplane, the control line (322) may be a data bus on the backplane. A more detailed description of the master and slave switching centers (207, 209) can be found in U.S. Pat. No. 5,175,727.

As shown, the master switching center (207) receives communication system data signals from communication system #1 via the framer (308). The communication system data signals are formatted in compliance with a TDM protocol, and thus constitute data frames placed within individual timeslots. The framer (308) synchronizes incoming data frames—hereinafter assumed to comprise pulse-code modulation (PCM) data—to the frame rate of the shared and dedicated communication ports (201, 203). In a preferred embodiment, the shared and dedicated communication ports (201, 203) each have 30 available timeslots. The output of the framer (308) is directly placed, via the driver (310), onto, in this example, the shared communication port (201) labeled with the numeral '0'.

The shared communication ports (201) make communication system data signals within the communication system network available to the switching centers (207, 209). Communication system data signals from the communication ports (201, 203) are received by the switching centers (207, 209) via the receivers (302, 312) and routed to the summers (304, 314) for audio processing. Processed audio outputs of the summer (304) in the master switching center (207) are routed to communication system #1 via the driver (306). Processed audio outputs of the summer (314) in the slave switching center (209) are routed to the driver (316) and, via the loopback path (317), to the framer (318). Similar to the operation of the master switching center (207), the output of the framer (318) is placed, via the driver (320), onto the dedicated communication port (203). Assuming once again that the master and slave switching centers (207, 209) are Ambassadors, their summing capabilities are limited to 1746 summing operations per data frame period. Operating as described above, the slave switching center (209) acts as an additional summing resource for the master switching center (207).

The master switching center (207) and the slave switching center (209) communicate control and status information to each other via the control line (322). For purposes of illustration, individual timeslots on various communication ports will hereafter be referred to by identifier pairs composed of the communication port number and the time slot number, such as {port #, time slot #}. For example, time slot 3 on (dedicated) communication port 31 is identified by the pair {31, 3}. Thus, the master switching center (207) may use the control line (322) to direct the slave switching center (209) to sum those audio sources (communication system data signals) referenced by {0, 1}, {5, 21}, and {30, 2}. In turn, the slave switching center (209) may use the control line (322) to inform the master switching center (207) that the resulting summed audio is being placed onto the dedicated communication port in {31, 0}.

As alluded to above, a master switching center may reach the limit of its own audio processing capability and request additional processing from the associated slave switching center slave switching center. As an example, and with reference to FIGS. 1, 2, and 3, the following scenario is considered:

An operator at operator station 14 (e.g., 111) in communication system 1 (e.g., 103) requests that audio source {3, 7} be added to his/her primary monitor speaker, which speaker is currently monitoring only audio source {16, 15 }. Using known signaling techniques (e.g., outbound signaling words), signal router 1 (e.g., 105) routes this request to master switching center 1 (e.g., 207). When master switching center 1 determines that it cannot accommodate this addition with its own summer (304), master switching center 1 uses the control line (322) to direct slave switching center 1 (e.g., 209) to sum audio source {16, 15} and {3, 7}. Slave switching center 1 then uses the control line (322) to inform master switching center 1 that it will put the result of this summing onto the dedicated communication port (e.g., 203) as audio source {31, 28}.

In slave switching center 1, audio sources {3, 7} and {16, 15 } are received from the shared communication ports (201) and passed to its summer (314), where the respective PCM samples are summed together. The driver (316) forwards the result of the summation to the framer (318) via the loopback path (317). The framer (318) routes the properly framed summed audio to the driver (320), which in turn places the summed audio onto the dedicated communication port in time slot 28. This summed audio {31, 28} is made available only to master switching center 1 and slave switching center 1 by configuration of the isolator switches (211).

The summed audio {31, 28} is received by master switching center 1 and passed to its summer (304). In this example, the summer (304) does not need to perform any further processing to the summed audio, thus the summed audio is routed to time slot 14 (corresponding to operator station 14 in communication system 1) via the driver (306). Signal router 1 passes the required summed audio in time slot 14 to operator station 14 (signal destination) for presentation to the primary monitor speaker. In this manner, listening capacity of the operator's monitor speaker is augmented, allowing the operator to hear more conversations without having to reconfigure the entire system.

The present invention provides a method and apparatus for augmenting listening capacity of a signal destination within a communication system network. With such a method, the listening capacity of a signal destination is increased without the use of additional equipment, and without undue reconfiguration of the communication system network. By linking a slave switching center to a master switching center through the use of a dedicated communication port, the summing capability of the master switching center is increased. This in turn allows more audio sources to be summed and presented to the signal destination.

What is claimed is:

1. A communication system network that includes a processing multiplexer coupled to a plurality of communication systems, wherein each of the communication systems comprises:

a plurality of signal sources, wherein at least some of the signal sources produce communication system data signals; and a plurality of signal destinations; wherein the processing multiplexer comprises a plurality of shared communication ports that each support one of the plurality of communication systems, the processing multiplexer further comprising:

a dedicated communication port;

a slave switching center, coupled to the dedicated communication port and the shared communication ports, for summing communication system data signals from at least one of the shared communication ports to produce summed communication data, wherein the summed communication data is presented to the dedicated communication port; and a master switching center, coupled to the dedicated communication port and the shared communication ports, for presenting processed communication data signals to at least one of the plurality of signal destinations of a select one of the plurality of communication systems, wherein the processed communication data signals comprise the summed communication data received from the dedicated communication port and the communication system data signals received from the shared communication ports.

2. The communication system network of claim 1, wherein the shared communication ports and the dedicated communication port utilize a Time Division Multiplexed (TDM) protocol that establishes time slots, and wherein the summed communication data comprises a combination of information from a predetermined group of the time slots.

3. In a communication system network that includes a processing multiplexer coupled to a plurality of communication systems, wherein each of the communication systems further includes a plurality of signal sources, a signal router for receiving communication system data signals and routing the communication system data signals to at least one of a plurality of signal destinations, each of the plurality of signal destinations having a predetermined listening capacity, and wherein the processing multiplexer includes a plurality of shared communication ports that each support one of the plurality of communication systems and a plurality of switching centers coupled to the plurality of shared communication ports, a method of augmenting the predetermined listening capacity of at least one of the signal destinations, the method comprising the steps of:

a) configuring at least one of the plurality of switching centers as a slave switching center;

b) configuring at least one of the plurality of switching centers as a master switching center that is associated with the at least one slave switching center;

c) providing at least one dedicated communication port, wherein the slave switching center and the master switching center are coupled to the at least one dedicated communication port;

d) using the slave switching center to sum the communication system data signals from at least one of the shared communication ports to produce summed communication data;

e) presenting the summed communication data to at least a portion of the at least one dedicated communication port; and f) using the master switching center to present processed communication data to at least one of the plurality of signal destinations of a select one of the plurality of communication systems, wherein the processed communication data comprises the summed communication data received from the at least one dedicated communication port and the communication system data signals received from the shared communication ports.

4. The method of claim 3 further comprising the step of:

g) converting the at least one dedicated communication port to a shared communication port when the predetermined listening capacity is adequate to support a desired communication configuration.

5. The method of claim 3, wherein the plurality of shared communication ports and the at least one dedicated communication port utilize a Time Division Multiplexed (TDM) protocol that establishes a plurality of time slots, and wherein step (d) further comprises the step of, at the master switching center, directing an associated slave switching center to sum a predetermined group of time slots.

6. The method of claim 5, wherein step (e) further comprises the steps of, at the associated slave switching center:

e1) identifying at least one time slot to which the summed communication data is to be presented; and e2) communicating to the master switching center an identity for the at least one time slot.

7. The method of claim 3, wherein step (f) further comprises the step of summing the communication system data signals.

8. In a communication system network that includes a processing multiplexer coupled to a plurality of communication systems, wherein each of the communication systems further includes a plurality of signal sources, a signal router for receiving communication system data signals and routing the communication system data signals to at least one of a plurality of signal destinations, each of the plurality of signal destinations having a predetermined listening capacity, and wherein the processing multiplexer includes a plurality of switching centers coupled to a plurality of shared communication ports that each support one of the plurality of communication systems, wherein the plurality of shared communication ports utilize a Time Division Multiplexed (TDM) protocol that establishes a plurality of time slots, a method of augmenting the predetermined listening capacity of at least one of the signal destinations, the method comprising the steps of:

a) configuring at least one of the plurality of switching centers as a slave switching center;

b) configuring at least one of the plurality of switching centers as a master switching center that is associated with the at least one slave switching center;

c) coupling the at least one master switching center to the at least one slave switching center associated therewith via at least one dedicated communication port, wherein the at least one dedicated communication port utilizes the TDM protocol;

d) when the predetermined listening capacity is inadequate to support a desired communication configuration, using the slave switching center to sum the communication system data signals from at least one of the shared communication ports to produce summed communication data;

e) presenting the summed communication data to at least a portion of the at least one dedicated communication port; and f) using the master switching center to present processed communication data to at least one of the plurality of signal destinations of a select one of the plurality of communication systems, wherein the processed communication data comprises the summed communication data received from the dedicated communication port and the communication system data signals received from the shared communication ports.

9. The method of claim 8, wherein step (e) further comprises the steps of, at the slave switching center:

e1) identifying at least one time slot to which the summed communication data was presented; and e2) communicating to the master switching center an identity for the at least one time slot.

* * * * *